United States Patent [19]
Flood

[11] Patent Number: 5,864,613
[45] Date of Patent: Jan. 26, 1999

[54] SYSTEM AND METHOD FOR CONTROLLING TELEPHONE USE

[75] Inventor: Robert J. Flood, Allen, Tex.

[73] Assignee: MCI Communications Corporation, Washington, D.C.

[21] Appl. No.: 714,475

[22] Filed: Sep. 16, 1996

[51] Int. Cl.[6] ................................................. H04M 1/66
[52] U.S. Cl. ...................... 379/188; 379/192; 379/199; 379/200; 379/198
[58] Field of Search .................................. 379/200, 188, 379/189, 192, 196, 197, 198, 199, 102.01, 88, 190, 88.12

[56] References Cited

U.S. PATENT DOCUMENTS

| | | | |
|---|---|---|---|
| 4,993,062 | 2/1991 | Dula et al. | 379/189 |
| 5,062,134 | 10/1991 | Laird | 379/199 |
| 5,329,578 | 7/1994 | Brennan et al. | 379/196 |
| 5,388,150 | 2/1995 | Schneyer et al. | 379/142 |
| 5,408,528 | 4/1995 | Carlson et al. | 379/142 |
| 5,454,033 | 9/1995 | Hahn et al. | 379/198 |
| 5,655,013 | 8/1997 | Gainsboro | 379/199 |

FOREIGN PATENT DOCUMENTS 63-266954  11/1988  Japan ...................................... 379/199

OTHER PUBLICATIONS

TCI Programmable Call Controller for Selective Call Control (TC–1013SL), © 1990, 379/200.
Hello Direct Winter 1991 Catalog, pp. 38.

Primary Examiner—Ahmad F. Matar

[57] ABSTRACT

A system and method for controlling the use of a telephone based on usersupplied access criteria. The system includes a database for storing the access criteria. The access criteria can be modified in response to commands received from the telephone. The system also includes a switch, electrically coupled between the telephone and a telephone network, for selectively coupling the telephone and the telephone network based on the access criteria stored in the database.

6 Claims, 4 Drawing Sheets

SYSTEM AND METHOD FOR CONTROLLING TELEPHONE USE

BACKGROUND OF THE INVENTION

1. Field of the Invention

The present invention relates generally to controlling the use of a telephone, and more particularly to permitting a telephone user to establish detailed criteria governing the use of his telephone.

2. Related Art

The telephone is an integral part of everyday life. Users, both commercial and residential, employ the telephone to great advantage in every field and in every task, great and small. However, in an era of tighter budgets, the cost of telephone use has surfaced as a significant expense. Users take great pains to limit their use of the telephone as a way to conserve scarce financial resources. But a telephone user may not be the sole user of his telephone.

A typical telephone user shares his telephone with others, whether voluntarily or not. Obviously, the budget-conscious user will seek to limit the telephone costs incurred by the user's "guest users."

One approach available to the user is simply to request the frugality and forbearance of the user's guest users and their telephone friends. However, when these guests are teenage children in a residential setting, these pleas may fall on deaf ears. Unauthorized after-hours users in a commercial setting are even less likely to comply.

Another approach is available through limited services offered by some Regional Bell Operating Companies (RBOCs). One such service permits a user, by making a special request, to completely block outgoing calls to certain toll exchanges (for example, "1-900" telephone numbers). Another such service permits the user, also by making a special request, to block incoming calls from a limited number of user-specified telephone numbers.

One disadvantage of these approaches is that these services are inflexible. For example, outgoing calls can only be blocked from entire telephone exchanges, and incoming calls can only be blocked from a limited number of telephone numbers. Further, the limitations apply around the clock. Thus in a commercial setting, a user cannot limit after-hours use without limiting business-hour use also.

Another disadvantage of these services is that they are difficult to modify. They are imposed only after the user makes a special request is made to the telephone company, and are not easily altered.

What is needed, therefore, is a quick and easy way for a telephone user to control telephone access by time of day, calling party, and the like.

SUMMARY OF THE INVENTION

The present invention is a system and method for controlling access between a telephone and a telephone network based on user-supplied access criteria. The system (referred to hereinafter as a "call caging" system) includes a database for storing the access criteria, means for modifying the access criteria stored in the database in response to commands received from the telephone, and a switch, electrically coupled between the telephone and the telephone network, for selectively coupling the telephone and the telephone network based on the access criteria stored in the database.

The system allows the user to establish a database record for each telephone number from which and/or to which calls should be blocked. However, the system allows the user to establish one or more validity periods for blocked telephone numbers during which calls may be made or received. The system also allows the user to establish time limits during validity periods beyond which a call with a blocked telephone number may not extend. When the time limit is exceeded, the system announces the end of the period to the parties and terminates the call.

One advantage of the present invention is that it permits a telephone user to limit telephone use with respect to user-specified telephone numbers.

Another advantage of the present invention is that it permits a telephone user to limit telephone use during user-specified times of day.

Another advantage of the present invention is that it permits a telephone user to limit telephone use with respect to user-specified guest users.

Further features and advantages of the present invention as well as the structure and operation of various embodiments of the present invention are described in detail below with reference to the accompanying drawings. In the drawings, like reference numbers indicate identical or functionally similar elements. Additionally, the left-most digit of a reference number identify the drawing in which the reference number first appears.

BRIEF DESCRIPTION OF THE FIGURES

The present invention will be described with reference to the accompanying drawings, wherein.

DETAILED DESCRIPTION OF THE PREFERRED EMBODIMENTS

Figure 1:
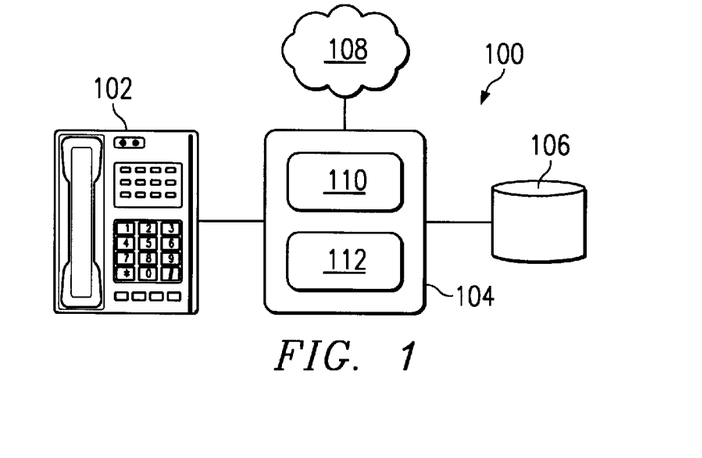
FIG. 1 is a block diagram of a call caging system 100 according to a preferred embodiment of the present invention.

FIG. 1 is a block diagram of a call caging system 100 according to a preferred embodiment of the present invention. Call caging system 100 includes a telephone 102, a switch 104, a database 106, and a telephone network 108, which are interconnected by various communication busses. The bus interconnecting telephone 102 and switch 104 is commonly referred to as a "line." The bus interconnecting switch 104 and network 108 is commonly referred to as a "trunk." Telephone network 108 is a telephone network of conventional design.

Telephone 102 can be a telephone of conventional design. Telephone 102 is used for placing and receiving calls to and from network 108, and for sending commands to switch 104 to enter and modify access criteria stored on database 106. Database 106 can be a database of conventional design. The user-supplied access criteria stored on database 106 describes the particular limitations the user wishes to impose upon the use of telephone 102, as described below.

In a residential embodiment, switch 104 is a Class 5 switch located remotely from telephone 102. In a commercial embodiment, switch 104 is a private branch exchange (PBX), which can be co-located with telephone 102 at the user's location. In a preferred embodiment, switch 104 includes a switch intelligence 110 and a switch fabric 112. Switch fabric 112 physically interconnects the communications busses. Switch intelligence 110 directs the operation of the switch fabric based on control signals (for example, telephone numbers) received by the switch.

The present invention will be discussed in five parts. First, an example environment is described within which the present invention can operate. Second, an example structure for database 106 is described. Third, the operation of the present invention in establishing and modifying access criteria on database 106 is described. Fourth, the operation of the present invention during an incoming call (that is, a call from network 108 to telephone 102) is described. Finally, the operation of the present invention during an outgoing call (that is, a call from telephone 102 to network 108) is described.

Figure 2:
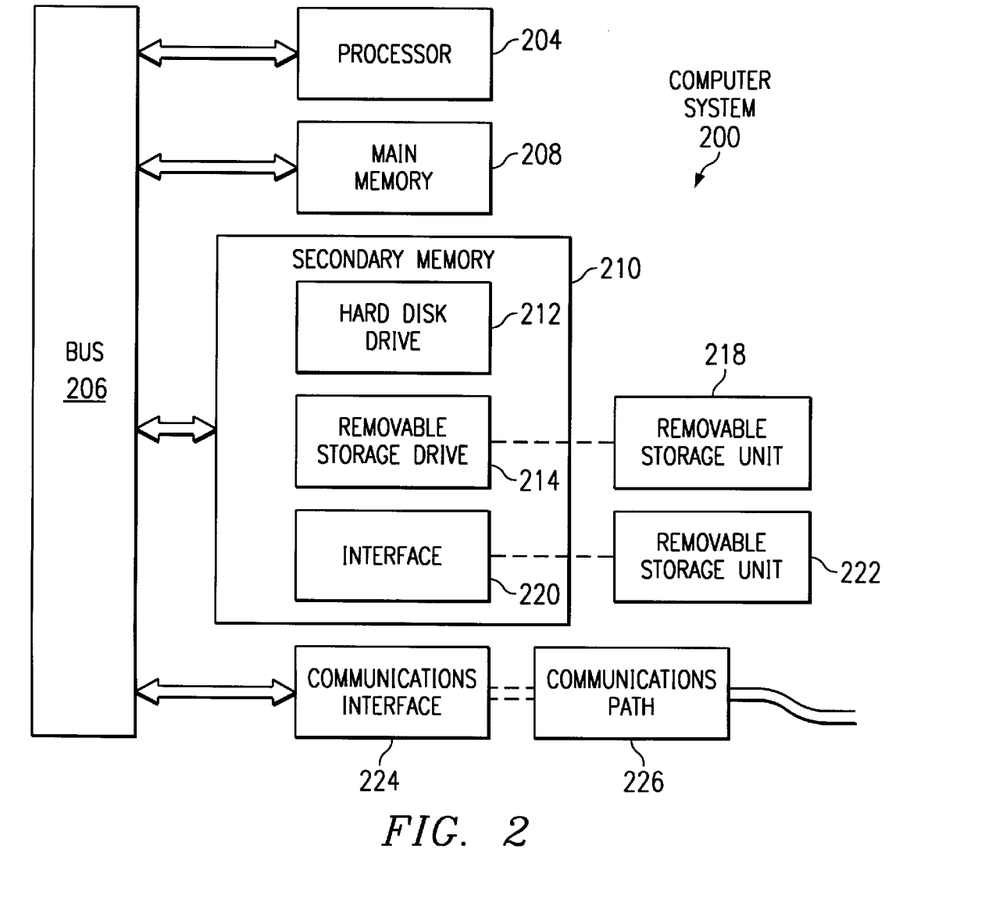
FIG. 2 is a block diagram illustrating an example environment within which the present invention can operate.

In the preferred embodiment, switch intelligence 110 includes a computer system, hardware state machine, or the like as an environment within which the present invention can operate. Before describing the operation of the present invention in detail, it is useful to first describe such an exemplary environment. FIG. 2 is a block diagram illustrating such an example environment. The environment is a computer system 200 that can form a part of switch intelligence 110. Computer system 200 includes one or more processors, such as processor 204. The processor 204 is connected to a communications bus 206. Various embodiments are described in terms of this example computer system. After reading this description, it will be apparent to a person skilled in the relevant art how to implement the present invention using other computer systems, computer architectures, hardware state machines, look-up tables, and the like, and various combinations thereof.

Computer system 200 also includes a main memory 208, preferably random access memory (RAM), and can also include a secondary memory 210. The secondary memory 210 can include, for example, a hard disk drive 212 and/or a removable storage drive 214, representing a floppy disk drive, a magnetic tape drive, an optical disk drive, etc. The removable storage drive 214 reads from and/or writes to a removable storage unit 218 in a well known manner. Removable storage unit 218 represents a floppy disk, magnetic tape, optical disk, etc. As will be appreciated, the removable storage unit 218 includes a computer usable storage medium having stored therein computer software and/or data.

In alternative embodiments, secondary memory 210 may include other similar means for allowing computer programs or other instructions to be loaded into computer system 200. Such means can include, for example, a removable storage unit 222 and an interface 220. Examples can include a program cartridge and cartridge interface (such as that found in video game devices), a removable memory chip (such as an EPROM, or PROM) and associated socket, and other removable storage units 222 and interfaces 220 which allow software and data to be transferred from the removable storage unit 222 to computer system 200.

Computer system 200 can also include a communications interface 224. Communications interface 224 allows software and data to be transferred between computer system 200 and external devices through communications path 226. Examples of communications interface 224 can include a modem, a network interface (such as an Ethernet card), a communications port, etc. Software and data transferred through communications interface 224 are in the form of signals which can be electronic, electromagnetic, optical or other signals capable of being received by communications interface 224 through communications path 226.

In a preferred embodiment of the present invention, a user supplies access criteria to call caging system 100 by issuing commands to call caging system 100 using telephone 102. In one embodiment, these commands are issued using the keypad of telephone 102. In another embodiment the user issues voice commands over telephone 102 and call caging system 100 employs a voice-recognition device to recognize the voice commands. As would be apparent to one skilled in the relevant art, other methods of issuing commands to call caging system 100 can be employed without departing from the spirit and scope of the present invention.

According to a preferred embodiment, the user can establish separate access criteria for any telephone number. By using wildcard designations when specifying telephone numbers, users can quickly and easily establish access criteria that apply to groups of telephone numbers. For example, by entering "1-900-???-????" as the telephone number, where "?" is a single-digit wildcard, the user can establish access criteria for all "900" telephone numbers. As another example, by entering "1-*" as the telephone number, where "*" is a multiple-digit wildcard, the user can establish access criteria for all long-distance, toll, and toll-free calls. Other variations can be employed without departing from the spirit and scope of the present invention.

By manipulating the access criteria for a given telephone number, the user can block incoming calls from that telephone number to the user's telephone, block outgoing calls from the user's telephone to that telephone number, or both. For calls that are blocked in this fashion, the user can specify periods of time (hereinafter referred to as "validity periods") during which the blocking is suspended, so that these calls can be made. This feature can be used, for example, to block all outgoing calls from a business telephone during off-hours.

The user can also restrict the duration of telephone calls made to and/or from a given telephone number during a validity period. For example, a parent may wish to limit a child's long-distance calls to a distant friend to five minutes a day. The user can specify such a duration for each validity period. If such a call exceeds its duration, the system announces the event to the parties and terminates the call. An example data structure for storing this access criteria is described below.

Table 1 depicts an example high level data structure for database 106. This structure comprises a user information field, a message information field, and a filter table. These fields are described in further detail with reference to Tables 2–4 below.

TABLE 1

User Information
Message Information
Filter Table

Table 2 depicts an example data structure for the User Information field of Table 1. Table 2 includes two fields: User Telephone Number and Passcode. The User Telephone Number field contains the telephone number of the user to which the access criteria in the filter table applies. Call caging system 100 locates the filter table using the user telephone number whenever a call is placed to or from the user telephone number. In order to modify the access criteria contained in the filter table, the user must enter the passcode value specified in the Passcode field. The use of such a passcode prevents unauthorized access to a user's filter table.

TABLE 2

User Telephone Number
Passcode

Table 3 depicts an example data structure for the Message Information field of Table 1. Table 3 includes three fields, each containing one recorded message. These recorded messages can be supplied by the user of telephone 102. The Block Incoming Calls Indication message is used to indicate to outside callers that their call to telephone 102 is blocked. The Block Outgoing Calls Indication message is used to indicate to guest users of telephone 102 that outgoing calls to the dialed telephone number are blocked. The Duration Expired message is used to indicate to parties in an active call that the time limit set for their call has expired.

TABLE 3

Block Incoming Calls Indication Message
Block Outgoing Calls Indication Message
Duration Expired Message Table 4 depicts an example data structure for the filter table. The filter table includes one record for each telephone number (or group of telephone numbers) to and/or from which calls are sought to be blocked. The number of records that may be stored in the filter table is limited only by the storage capacity of database 106 and the number of users supported. For each record, the filter table includes a Telephone No. field, a Block Indicator field, a Validity Period(s) field and a Duration field. The telephone number (or numbers) to which the record's access criteria are to be applied is stored in the Telephone No. field. The contents of the Block Indicator field indicate whether calls to that telephone number, from that telephone number, or both are to be blocked. The Validity Period(s) field specifies the periods, if any, during which the blocking does not apply. In a preferred embodiment a value of 0 indicates that the restriction for that telephone number applies at all times.

TABLE 4

| Telephone No. (1) | Block Indicator (1) | Validity Period(s) (1) | Duration (1) |
|---|---|---|---|
| Telephone No. (2) | Block Indicator (2) | Validity Period(s) (2) | Duration (2) |
| * | | | |
| * | | | |
| * | | | |
| Telephone No. (n) | Block Indicator (n) | Validity Period(s) (n) | Duration (n) |

However, calls to and from blocked telephone numbers may be made during validity periods if a duration is specified in the Duration field. The value in the Duration field indicates the total amount of time during a validity period for which one or more telephone calls to and/or from a blocked telephone number may be made. In one embodiment, the duration value limits the duration of each call to the indicated telephone number. In another embodiment, the duration value limits the total duration of all calls to and/or from the indicated telephone number during a single validity period (that is, the sum of the durations of all calls made to the telephone number during a single validity period cannot exceed the Duration value).

The above-described data structure is presented by way of illustration only. As would be apparent to one skilled in the relevant art, other data structures can be employed without departing from the spirit and scope of the present invention.

Figure 3:
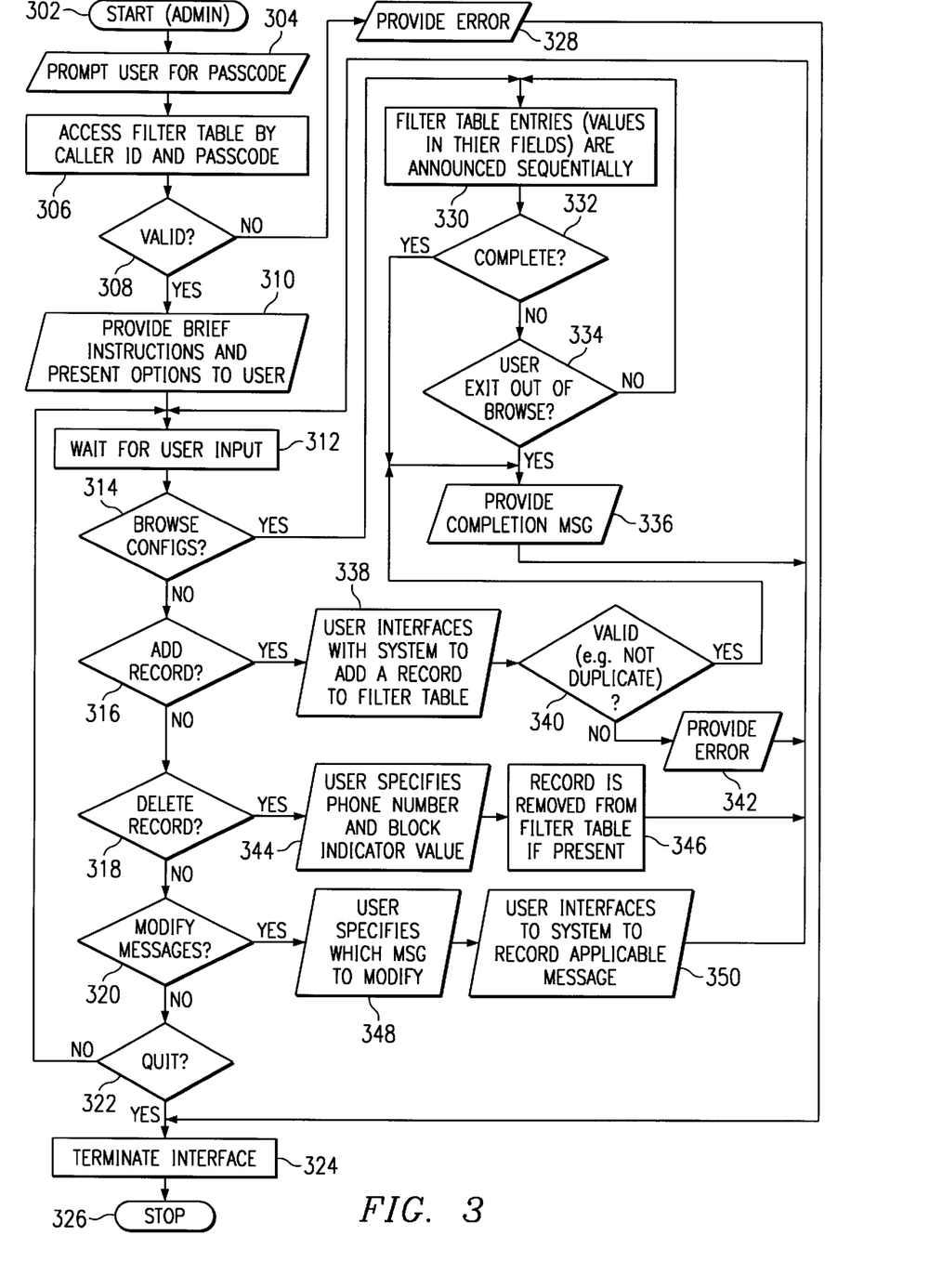
FIG. 3 is a flowchart depicting the operation of a preferred embodiment of the present invention in the database administration phase.

FIG. 3 is a flowchart depicting the operation of a preferred embodiment of the present invention in the database administration phase. In this phase, the user can enter or modify telephone access criteria stored on database 106. The user begins by dialing the access telephone number for the call caging service. The user then receives a prompt for the user passcode, as shown in a step 304. The user then enters the user's passcode using telephone 102. Using a Caller ID service, call caging system 100 then accesses the user's filter table and verifies the entered passcode, as shown in a step 306. Caller ID services are used to identify the telephone number for an incoming call, as is well-known in the art. If the passcode is found to be invalid, as shown by the "N" branch from step 308, then call caging system 100 provides an error message, as shown in a step 328, and terminates the interface as shown in a step 324.

However, if the entered passcode is valid, then call caging system 100 provides brief instructions and presents options to the user, as shown in a step 310. The system then waits for user input, as shown in a step 312. If the user desires to browse the current configuration of his filter table, as shown by the "Y" branch from step 314, then call caging system 100 sequentially announces the values and the fields of the filter table, as shown in a step 330. The user can indicate completion of the browse at any time as shown by the "Y" branch from step 332. However, if the user completes the browse, as indicated by the "N" branch from step 332, then call caging system 100 prompts the user to exit the browse as shown in a step 334. If the user wishes to repeat the browse, as shown by the "N" branch from step 334, then processing resumes at step 330. However, if the user elects to exit the browse, as indicated by the "Y" branch from step 334, then call caging system 100 provides a completion message, as shown in a step 336 and the user interface terminates, as shown in a step 324.

During the database administration phase, the user may desire to add a record to the filter table, as shown in a step 316. If the user so elects, as indicated by the "Y" branch from step 316, then the user interfaces with the system to add a record to the filter table corresponding to a given telephone number, as shown in a step 338. If the completed record is valid, as indicated by the "Y" branch from step 340, then the system provides a completion message, as shown in a step 336, and call caging system 100 returns the user to step 312. However, if the new record is not valid (for example, if the record duplicates another), as indicated by the "N" branch from step 340, then call caging system 100 provides an error message, as shown in a step 342, and returns the user to step 312.

During the database administration phase, the user may desire to delete a record in the filter table, as shown in a step 318. If the user so elects, as indicated by the "Y" branch from step 318, then the user specifies the telephone number and block indicator value for the entry, as shown in a step 344. Call caging system 100 uses this information to locate the indicated record in the filter table, and removes that record if present, as shown in a step 346. Call caging system 100 then returns the user to step 312.

During the database administration phase, the user may desire to modify the recorded messages in the database, as shown in a step 320. If the user so elects, as indicated by the "Y" branch from step 320, then the user specifies the message to be modified, as shown in a step 348, and then interfaces to the system to record that message, as shown in a step 350. Upon completion, call caging system 100 returns the user to step 312.

At any point during the database administration phase, the user may desire to quit, as shown in a step 322. If the user so elects, as indicated by the "Y" branch from step 322, then call caging system 100 terminates the interface, as shown in a step 324.

Figures 4A, 4B, 4C:
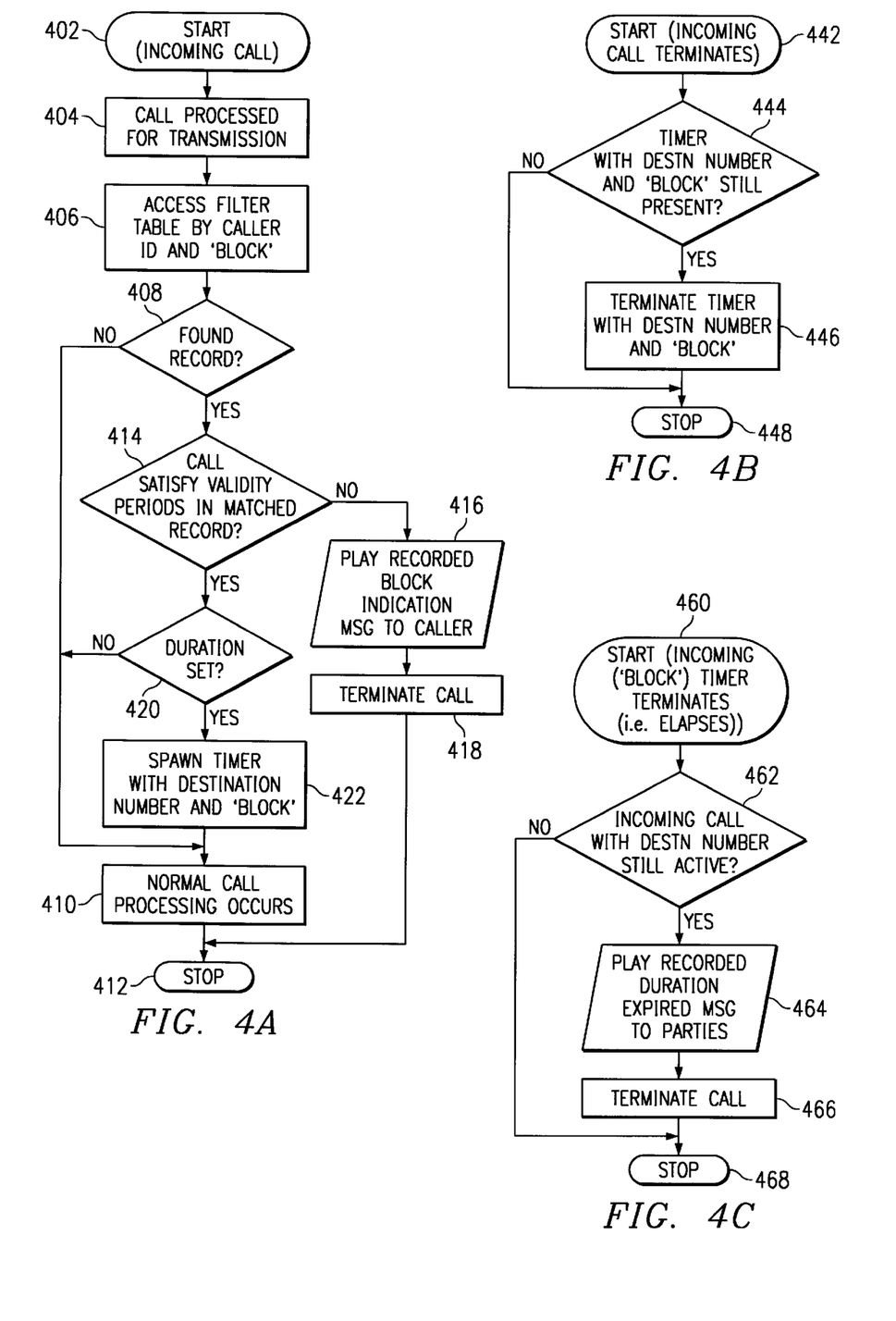
FIGS. 4A, 4B, and 4C collectively depict the operation of the preferred embodiment of the present invention for incoming calls.

FIG. 4 depicts the operation of the preferred embodiment of the present invention for incoming calls. FIG. 4A depicts the operation of the invention when an incoming call is received. FIGS. 4B and 4C depict the operation of a timer for measuring the duration of an incoming call during a validity period.

Referring to FIG. 4A, when call caging system 100 receives an incoming call from network 108, as shown in a step 402, the incoming call is processed for transmission, as shown in a step 404. Call caging system 100 then identifies the telephone number of the calling party using a Caller ID service and searches the user's filter table for a record corresponding to that telephone number, as shown in a step 406. If no record is found, as indicated by the "N" branch from a step 408, then normal call processing occurs, as shown in a step 410.

However, if a record is found corresponding to the caller, as indicated by the "Y" branch from step 408, then call caging system 100 examines the record to determine whether the call has arrived during a validity period specified by the record, as shown in a step 414. If the call has not arrived during a validity period, as indicated by the "N" branch from step 414, then call caging system 100 plays the recorded block indication message to the caller, as shown in a step 416. Call caging system 100 then terminates the call, as shown in a step 418.

However, if the call has arrived during a validity period, then call caging system 100 examines the record for the caller's telephone number to determine whether a duration has been set for that telephone number, as shown in a step 420. If no duration has been set, as indicated by the "N" branch from step 420, then normal call processing occurs, as shown in a step 410. However, if a duration has been set for that telephone number, as indicated by the "Y" branch from step 420, then call caging system 100 spawns a timer having that duration for that telephone number and a block indication, as shown in a step 422. Normal processing then occurs, as shown in a step 410.

FIG. 4B depicts the operation of the timer spawned in step 422 when the incoming call terminates (for example, when one of the parties to the call "hangs up"), as shown in a step 442. When this occurs, call caging system 100 determines whether the associated timer is still present, as shown in a step 444. If the timer is still present, call caging system 100 terminates the timer, as shown in a step 446.

However, the timer for a timed call may elapse during the call. FIG. 4C depicts the operation of the present invention when this occurs, as shown in a step 460. If a timed call is still active when the timer elapses, as indicated by the "Y" branch from step 462, then call caging system 100 plays the recorded Duration Expired message to the parties, as shown in a step 464, and terminates the call, as shown in a step 466.

Figure 5A:
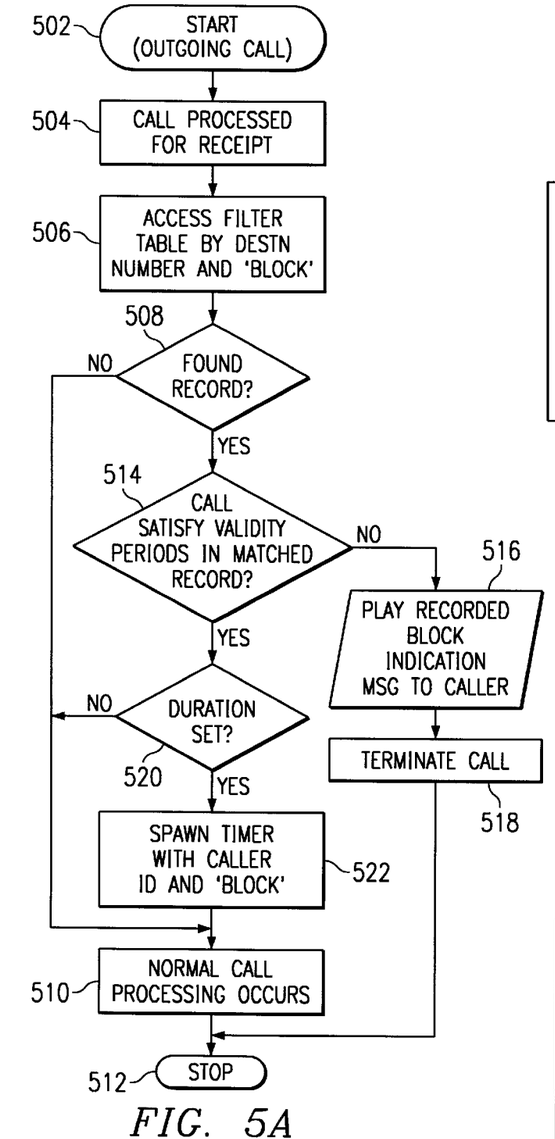
FIGS. 5A, 5B, and 5C collectively depict the operation of the preferred embodiment of the present invention for outgoing calls.
Figure 5B:
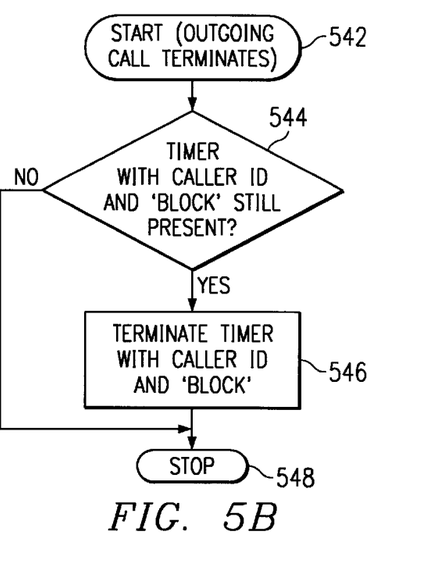
Figure 5C:
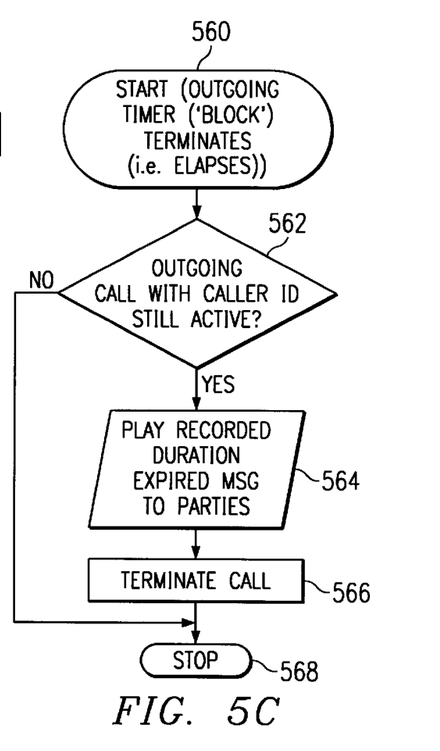

FIG. 5 depicts the operation of the preferred embodiment of the present invention for outgoing calls. FIG. 5A depicts the operation of the invention when an outgoing call is received. FIGS. 5B and 5C depict the operation of a timer for measuring the duration of an outgoing call during a validity period.

Referring to FIG. 5A, when call caging system 100 receives an outgoing call to network 108, as shown in a step 502, the outgoing call is processed for receipt, as shown in a step 504. Call caging system 100 then identifies the destination telephone number of the party being called and searches the user's filter table for a record corresponding to that destination telephone number, as shown in a step 506. If no record is found, as indicated by the "N" branch from a step 508, then normal call processing occurs, as shown in a step 510.

However, if a record is found corresponding to the destination telephone number, as indicated by the "Y" branch from step 508, then call caging system 100 examines the record to determine whether the call has arrived during a validity period specified by the record, as shown in a step 514. If the call has not arrived during a validity period, as indicated by the "N" branch from step 514, then call caging system 100 plays the recorded block indication message to the caller, as shown in a step 516. Call caging system 100 then terminates the call, as shown in a step 518.

However, if the call has arrived during a validity period, then call caging system 100 examines the record for the destination telephone number to determine whether a duration has been set for that telephone number, as shown in a step 520. If no duration has been set, as indicated by the "N" branch from step 520, then normal call processing occurs, as shown in a step 510. However, if a duration has been set for that telephone number, as indicated by the "Y" branch from step 520, then call caging system 100 spawns a timer having that duration for that telephone number and a block indication, as shown in a step 522. Normal processing then occurs, as shown in a step 510.

FIG. 5B depicts the operation of the timer spawned in step 522 when the outgoing call terminates, as shown in a step 542. When this occurs, call caging system 100 determines whether the associated timer is still present, as shown in a step 544. If the timer is still present, call caging system 100 terminates the timer, as shown in a step 546.

However, the timer for a timed call may elapse during the call. FIG. 4C depicts the operation of the present invention when this occurs, as shown in a step 560. If a timed call is still active when the timer elapses, as indicated by the "Y" branch from step 562, then call caging system 100 plays the recorded Duration Expired message to the parties, as shown in a step 564, and terminates the call, as shown in a step 566.

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A system for controlling access between a telephone and a telephone network based on user-supplied access criteria, comprising:

a database for storing the access criteria;

means for modifying the access criteria stored in said database in response to commands received from the telephone;

a switch, electrically coupled between the telephone and the telephone network, for selectively coupling the telephone and the telephone network based on the access criteria stored in said database;

means for rejecting calls to the telephone from at least one telephone number when the access criteria stored in said database indicates that calls from said telephone number are blocked;

means for rejecting calls from the telephone to at least one further telephone number when the access criteria stored in said database indicates that calls to said further telephone number are blocked;

means for allowing calls between the telephone and a blocked telephone number during a validity period when the access criteria stored in said database includes said validity period for said blocked telephone number; and means for allowing calls between the telephone and said blocked telephone number for a duration during said validity period when the access criteria stored in said database includes said duration for said blocked telephone number wherein said duration is a sum of lengths of time for multiple calls between the telephone and said blocked telephone number.

2. A method for controlling access between a telephone and a telephone network based on user-supplied access criteria, comprising the steps of:

storing the access criteria on a database;

modifying the access criteria stored in said database in response to commands received from the telephone;

selectively coupling the telephone and the telephone network based on the access criteria stored in said database;

rejecting calls to the telephone from at least one telephone number when the access criteria stored in said database indicates that calls from said telephone number are blocked;

rejecting calls from the telephone to at least one further telephone number when the access criteria stored in said database indicates that calls to said further telephone number are blocked;

allowing calls between the telephone and a blocked telephone number during a validity period when the access criteria stored in said database includes said validity period for said blocked telephone number; and allowing calls between the telephone and said blocked telephone number for a duration during said validity period when the access criteria stored in said database includes said duration for said blocked telephone number, wherein said duration is a sum of lengths of time for multiple calls between the telephone and said blocked telephone number.

3. In a system for controlling access between a telephone and a telephone network based on user-supplied access criteria, a computer program product comprising a computer usable medium having computer readable program code means embodied in said medium for causing an application program to execute on a computer, said computer readable program code means comprising:

a computer readable first program code means for causing the computer to store the access criteria in a database;

a computer readable second program code means for causing the computer to modify the criteria stored in said database in response to commands received from the telephone;

a computer readable third program code means for causing the computer to selectively couple the telephone and the telephone network based on the access criteria stored in said database;

a computer readable fourth program code means for causing the computer to reject calls to the telephone from at least one telephone number when the access criteria stored in said database indicates that calls from said telephone number are blocked;

a computer readable fifth program code means for causing the computer to reject calls from the telephone to least one telephone number when the access criteria stored in said database indicates that calls to said telephone number are at blocked;

a computer readable sixth program code means for causing said computer to allow calls between the telephone and a blocked telephone number during a validity period when the access criteria stored in said database includes said validity period for said blocked telephone number; and a computer readable seventh program code means for causing said computer to allow calls between the telephone and said blocked telephone number for a duration during said validity period when the access criteria stored in said database includes said duration for said blocked telephone number, wherein said duration is a sum of lengths of time for multiple calls between the telephone and said blocked telephone number.

4. A system for controlling access between a telephone and a telephone network based on user-supplied access criteria, comprising:

a database for storing the access criteria;

means for modifying the access criteria stored in said database in response to commands received from the telephone;

a switch, electrically coupled between the telephone and the telephone network, for selectively coupling the telephone and the telephone network based on the access criteria stored in said database;

means for rejecting calls from the telephone to at least one telephone number when the access criteria stored in said database indicates that calls to said telephone number are blocked;

means for allowing calls from the telephone to said blocked telephone number during a validity period when the access criteria stored in said database includes said validity period for said blocked telephone number; and means for allowing calls from the telephone to said blocked telephone number for a duration during said validity period when the access criteria stored in said database includes said duration for said blocked telephone number, wherein said duration is a sum of lengths of time for multiple calls from the telephone to said blocked telephone number.

5. A method for controlling access between a telephone and a telephone network based on user-supplied access criteria, comprising the steps of:

storing the access criteria on a database;

modifying the access criteria stored in said database in response to commands received from the telephone;

selectively coupling the telephone and the telephone network based on the access criteria stored in said database;

rejecting calls from the telephone to at least one telephone number when the access criteria stored in said database indicates that calls to said telephone number are blocked;

allowing calls from the telephone to said blocked telephone number during a validity period when the access criteria stored in said database includes said validity period for said blocked telephone number; and allowing calls from the telephone to said blocked telephone number for a duration during said validity period when the access criteria stored in said database includes said duration for said blocked telephone number, wherein said duration is a sum of lengths of time for multiple calls from the telephone to said blocked telephone number.

6. In a system for controlling access between a telephone and a telephone network based on user-supplied access criteria, a computer program product comprising a computer usable medium having computer readable program code means embodied in said medium for causing an application program to execute on a computer, said computer readable program code means comprising:

a computer readable first program code means for causing the computer to store the access criteria in a database;

a computer readable second program code means for causing the computer to modify the criteria stored in said database in response to commands received from the telephone;

a computer readable third program code means for causing the computer to selectively couple the telephone and the telephone network based on the access criteria stored in said database;

a computer readable fourth program code means for causing the computer to reject calls from the telephone to at least one telephone number when the access criteria stored in said database indicates that calls to said telephone number are blocked;

a computer readable fifth program code means for causing the computer to allow calls from the telephone to said blocked telephone number during a validity period when the access criteria stored in said database includes said validity period for said blocked telephone number; and a computer readable sixth program code means for causing the computer to allow calls from the telephone to said blocked telephone number for a duration during said validity period when the access criteria stored in said database includes said duration for said blocked telephone number, wherein said duration is a sum of lengths of time for multiple calls from the telephone to said blocked telephone number.

* * * * *